J. F. PARKER.
AUTOMOBILE LICENSE TAG FASTENING DEVICE.
APPLICATION FILED JAN. 30, 1919.
1,310,769.  Patented July 22, 1919.
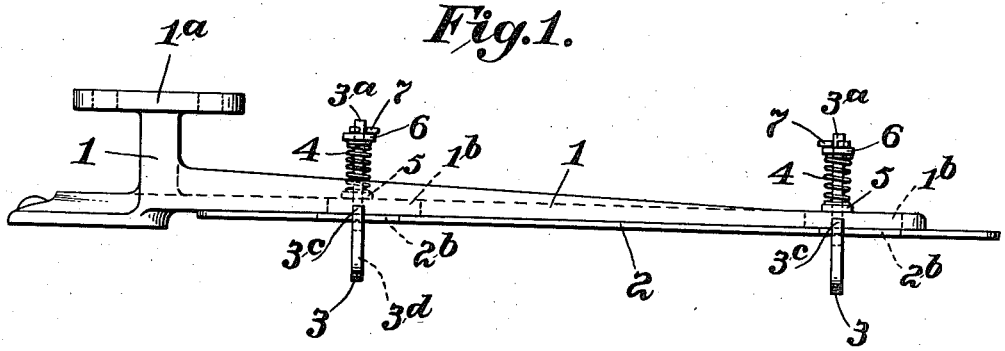
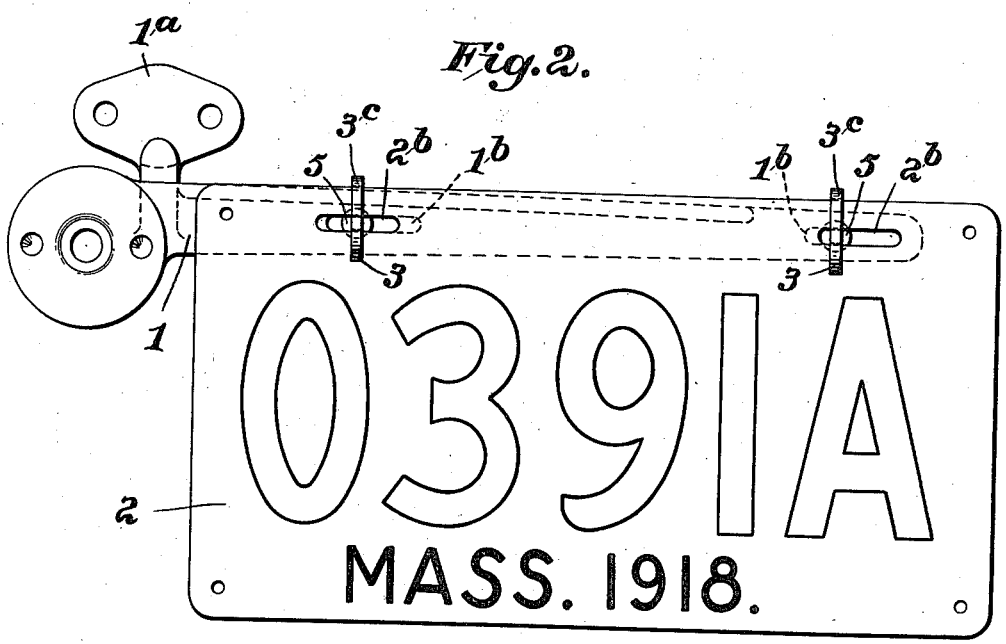
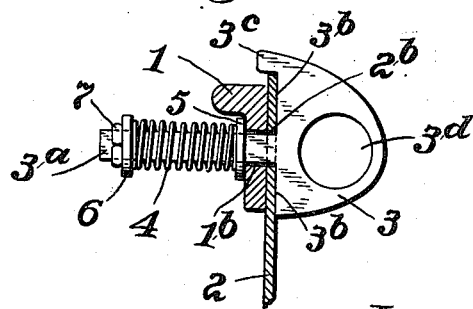
Inventor:
Joseph F. Parker,
by Hunn Middleton Donaldson Spear
Attys.

UNITED STATES PATENT OFFICE.

JOSEPH F. PARKER, OF GARDNER, MASSACHUSETTS.

AUTOMOBILE-LICENSE-TAG-FASTENING DEVICE.

1,310,769.　　　　　　　　Specification of Letters Patent.　　Patented July 22, 1919.

Application filed January 30, 1919. Serial No. 274,041.

*To all whom it may concern:*

Be it known that I, JOSEPH F. PARKER, a citizen of the United States, and resident of Gardner, Massachusetts, have invented certain new and useful Improvements in Automobile-License-Tag-Fastening Devices, of which the following is a specification.

My invention relates to improvements in means for securing the number plates or license tags to automobiles and aims to provide means of a simple, economical, and efficient construction by which such plates may be readily applied, may be securely held and yet capable of being readily detached and replaced by other plates.

With these and other objects in view the invention includes the novel features of construction and arrangement and combination of parts hereinafter described and particularly defined by the appended claim.

An embodiment of my invention is illustrated in the accompanying drawing, in which, Figure 1 is a plan view.

Fig. 2 a front elevation, and,

Fig. 3 a section on line 3—3 of Fig. 1.

Referring by reference characters to this drawing the numeral 1 designates a bracket, such as is ordinarily used for attachment to an automobile to support the number plates and which comprises an arm having suitable means at one end as indicated at 1ª to enable it to be secured to the proper part of the automobile. This bracket *per se* forms no part of my invention. The long arm 1 of the bracket is provided with two elongated slots 1ᵇ and these are designed to receive bolts, which pass through the slots and through corresponding slots with which all number plates are provided, such number plate being indicated at 2 and the slots referred to at 2ᵇ. The bolting of the number plates to the bracket, however, is objectionable in that it is inconvenient to manipulate the bolts and furthermore the number plates being exposed to the weather the bolts become rusted so that it is difficult to remove and replace the number plates at the expiration of the license period.

According to my invention I provide a detachable holding device which coöperates with these same slots and which requires practically no change in the brackets or in the number plates, and which can be readily applied by any unskilled person.

My attachment comprises a pair of holding clips 3, one for each slot in the bracket and as these are identical a description of one will suffice. This clip comprises a head or a clip portion 3 and a shank 3ª which is designed to pass through the slot in the bracket. Behind the bracket the shank is encircled by a spring 4, which abuts at the inner end against a washer 5 slidable upon the shank and at the outer end against a washer 6, which is held in place upon the shank by a cotter pin 7. The head of the clip has square faces or portions 3ᵇ which are designed to bear against the outer face of the number plate when the head of the clip is turned at right-angles to the plane of the slots, it being understood that the head of the clip is of a thickness and size which will enable it to pass through the slot when turned into parallelism therewith.

One edge of the clip is extended to form a lug 3ᶜ which, when the said clip is at right-angles to the plane of the slot, overlies the upper edge of the number plate and hence holds the clip against being turned accidentally into alinement with the slot, thereby making the clip self-locking.

The head of the clip is provided with means by which it may be drawn outwardly against the tension of the spring to disengage the lug from the top of the number plate, whereby the head of the clip may be turned into parallelism with the slot and such means may take the form of an opening 3ᵈ into which the finger of the operator may be inserted.

From the foregoing description it will be seen that my device is very simple and that it is readily applicable to the ordinary bracket, as it is only necessary to insert the shank through the slot in the bracket, thread the washers and spring upon the shank and apply the cotter pin to hold them in place.

It is also apparent that by the use of my device number plates may be readily changed as it is only necessary for the operator to pull each clip outwardly against the tension of the spring until the locking lug is disengaged from the upper edge of the plate, when the clips may be turned in parallelism to the slots in the plate and the number plate removed and replaced by a new number plate.

After the new number plate is in position and the clips again turned at right-angles to the slots with their lugs overhanging the upper edge of the plate the parts are effectually held against accidental displacement.

It will be understood that the number plates or license tags of most of the States are of uniform size. In a few unsual cases where the license plates carry a large number of figures they are made somewhat longer and such plates require only the cutting of an additional slot in the number plate.

What I claim is:

The combination with a supporting bracket having a circular aperture and a number plate having an elongated slot, of a holding device comprising a flat head adapted to pass through said slot and a shank lying in said circular aperture, a spring encircling said shank in rear of said bracket, a washer between the spring and bracket, a washer on the outer end of the shank against which the spring bears, and means for permanently holding said last named washer in position, said head having a straight edge for bearing against the face of the number plate and a lug at one end of said edge for overlying the upper edge of the number plate.

In testimony whereof, I affix my signature.

JOSEPH F. PARKER.